US008023582B2

(12) United States Patent
Ihm et al.

(10) Patent No.: US 8,023,582 B2
(45) Date of Patent: Sep. 20, 2011

(54) SIGNAL TRANSMISSION METHOD OF CLOSED-LOOP MIMO SYSTEM

(75) Inventors: Bin-Chul Ihm, Gyeonggi-Do (KR); Young-soo Yuk, Seoul (KR); Min-Seok Oh, Seoul (KR)

(73) Assignee: LG Electronics Inc., Seoul (KR)

( * ) Notice: Subject to any disclaimer, the term of this patent is extended or adjusted under 35 U.S.C. 154(b) by 965 days.

(21) Appl. No.: 11/039,989

(22) Filed: Jan. 20, 2005

(65) Prior Publication Data

US 2005/0157808 A1   Jul. 21, 2005

Related U.S. Application Data

(60) Provisional application No. 60/537,491, filed on Jan. 20, 2004.

(30) Foreign Application Priority Data

Feb. 10, 2004   (KR) .......................... 10-2004-0008777

(51) Int. Cl.
  *H04B 7/02*   (2006.01)
(52) U.S. Cl. ....................................... 375/267
(58) Field of Classification Search .................. 375/259, 375/260, 267, 316, 346, 347, 295, 299
  See application file for complete search history.

(56) References Cited

U.S. PATENT DOCUMENTS

| 6,144,711 | A  | * | 11/2000 | Raleigh et al. | ................ | 375/347 |
| 6,683,377 | B1 | * | 1/2004  | Shim et al.    |                  |         |
| 7,263,132 | B2 | * | 8/2007  | Horng et al.   | ................. | 375/267 |
| 2002/0013130 | A1 | * | 1/2002 | Kim et al.    | ........................ | 455/70 |
| 2002/0154713 | A1 |   | 10/2002 | Sparrman et al. | |        |
| 2002/0191535 | A1 | * | 12/2002 | Sugiyama et al. | ........... | 370/208 |
| 2003/0154435 | A1 |   | 8/2003 | Claussen et al. | |        |
| 2005/0101259 | A1 | * | 5/2005 | Tong et al.    | ....................... | 455/69 |

OTHER PUBLICATIONS

Yuk, et al. "An iterative decoded V-Blast system using maximum a posteriori criterion," IEEE 1099-1002, 2003.

* cited by examiner

*Primary Examiner* — Kevin M Burd

(74) *Attorney, Agent, or Firm* — Lee, Hong, Degerman, Kang & Waimey

(57) ABSTRACT

A closed-loop MIMO system includes a receiver for forming a new predefined set by using elements of a previous predefined set, selecting a certain matrix of the new predefined set, and feeding back an index of the matrix, if the number of transmit antennas increases, and a transmitter for performing signal transmission by multiplying the matrix of the feedback index to a transmission signal. Although the number of transmit antennas increases, candidate matrices can be simply obtained by using candidate matrices of a previous set. Moreover, to by proposing a reference for selecting an optimal solution with a small amount of calculation, burden on a system can be considerably reduced.

8 Claims, 2 Drawing Sheets

US 8,023,582 B2

SIGNAL TRANSMISSION METHOD OF CLOSED-LOOP MIMO SYSTEM

CROSS REFERENCE TO RELATED APPLICATIONS

Pursuant to 35 U.S.C. §119(a), this application claims the benefit of earlier filing date and right of priority to Korean Patent Application No. 10-2004-0008777, filed on Feb. 10, 2004, the content of which is hereby incorporated by reference herein in its entirety.

Pursuant to 35 U.S.C. §119(e)(1), this application claims the benefit of earlier filing date and right of Provisional Application No. 60/537,491, filed on Jan. 20, 2004, the content of which is hereby incorporated by reference herein in its entirety.

BACKGROUND OF THE INVENTION

1. Field of the Invention

The present invention relates to a MIMO (Multiple Input Multiple Output) system of mobile communication and, more particularly to a method for constructing and transmitting feedback information in a closed-loop MIMO system.

2. Description of the Related Art

The MIMO system is a technique for increasing capacity and high data rate transmission.

A closed-loop MIMO system feeding back channel information to a transmitter can acquire larger capacity and a lower bit error rate.

In spite of the advantages of the closed-loop scheme, system designers are reluctant to apply the closed-loop scheme for a physical system because the closed-loop scheme requires the very large feedback data and thus encroaches on one capacity of uplink and downlink.

The reason why the capacity of the feedback data is so large is because the feedback data is a matrix including complex numbers as elements and a dimension of the matrix is the product of the number of transmit antennas and the number of receive antennas.

In order to solve such a problem, a receiver of a related art closed-loop MIMO system feeds back only an index of an optimum solution.

FIG. 1 illustrates the construction of a general closed-loop MIMO system.

As shown in FIG. 1, a receiver 200 of the closed-loop MIMO system obtains $C_{optimal}$ by using a matrix (H) indicating a wireless channel environment, compares a distance between $C_{optimal}$ and elements of a predetermined matrix set (referred to as 'predefined set', hereinafter), and selects the closest element as a matrix with optimal performance (referred to as 'optimal solution', hereinafter).

Equation (1) shown below is an equation of an SVD (Singular Value Decomposition), one of methods used for obtaining $C_{optimal}$, in which 'U' means $C_{optimal}$.

$$H^H H = U \Sigma U^H \quad (1)$$

After the optimal solution is obtained, the receiver 200 feeds back information on the optimal solution to a transmitter 100. Because the transmitter 100 and the receiver 200 share information on the predefined set, the receiver 200 feeds back only the index of the optimal solution.

In FIG. 1, $\{C_1, C_2, C_3, \ldots, C_L\}$ defines the predefined set and each element of the predefined set is a matrix. Guides of the matrices $\{C_1, C_2, C_3, \ldots, C_L\}$ are orthonormality and have a maximum minimum distance. The orthonormality means $C_m^H C_m = I$ and the maximum minimum distance means that the predefined set should be formed with matrices whose minimum distance is the maximum. In order to determine elements of the predefined set, the receiver 200 searches every matrix and then determines matrices whose minimum distance becomes the maximum as candidate matrices of the predefined set.

However, the afore-mentioned related art has the following problems.

That is, first, in order to form the predefined set only with two guides, numerous orthogonal matrices are to be randomly selected as many as an arbitrary number and matrices whose minimum distance is the maximum are to be picked up, for which, thus, the arbitrary number must be considerably large. Namely, the related art method for forming the predefined set is ineffective because it lacks a structure and regularities.

Second, the processes are to be repeatedly performed whenever the number of transmit antennas is changed, making it difficult to immediately cope with a change in the system.

Third, elements of the predefined set are determined by searching every matrix one by one, which is very ineffective.

SUMMARY OF THE INVENTION

Therefore, one object of the present invention is to provide a signal transmission method of a closed-loop MIMO system designed for obtaining elements of a predetermined set systematically.

Another object of the present invention is to provide a signal transmission method of a closed-loop MIMO system designed for proposing a reference in selecting an optimal solution.

To achieve at least the above objects in whole or in parts, there is provided a closed-loop MIMO system including a receiver for forming a new predefined set by using elements of a previous predefined set, selecting a certain matrix of the new predefined set, and feeding back an index of the matrix, if the number of transmit antennas increases; and a transmitter for performing signal transmission by multiplying the matrix of the feedback index to a transmission signal.

Preferably, if there are two transmit antennas, elements of the predefined set are obtained according to an equation shown below:

$$\begin{bmatrix} \exp\left(j\frac{2\pi k_{11}}{K}\right) & \exp\left(j\frac{2\pi k_{12}}{K}\right) \\ \exp\left(j\frac{2\pi k_{21}}{K}\right) & \exp\left(j\frac{2\pi k_{22}}{K}\right) \end{bmatrix}$$

wherein $k_{mn}$ is one of an integer values of $0, 1, \ldots, K-1$, 'm' indicates a row and 'n' indicates a column.

Preferably, the certain matrix is selected by an equation shown below:

$$\arg\min_i \prod_m (C_i^H H^H H C_i)_{mm}$$

wherein 'H' is a matrix indicating a radio channel and $[\ ]^H$ means a conjugate transpose.

To achieve at least these advantages in whole or in parts, there is further provided a signal transmission method in a closed-loop MIMO system including: selecting a certain matrix from a new predefined set formed by using elements of a previous predefined set when the number of transmit antennas increases, and feeding back an index of the selected matrix to a transmitter; and multiplying the matrix of the feedback index to a transmission signal and transmitting the multiplied signal.

To achieve at least these advantages in whole or in parts, there is further provided a channel information transmission method of a receiver of a closed-loop MIMO system including: selecting a certain matrix from a new predefined set formed by using elements of a previous predefined set, if the number of transmit antennas increases; and feeding back an index of the selected matrix to a transmitter.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF THE PREFERRED EMBODIMENTS

Figure 1:
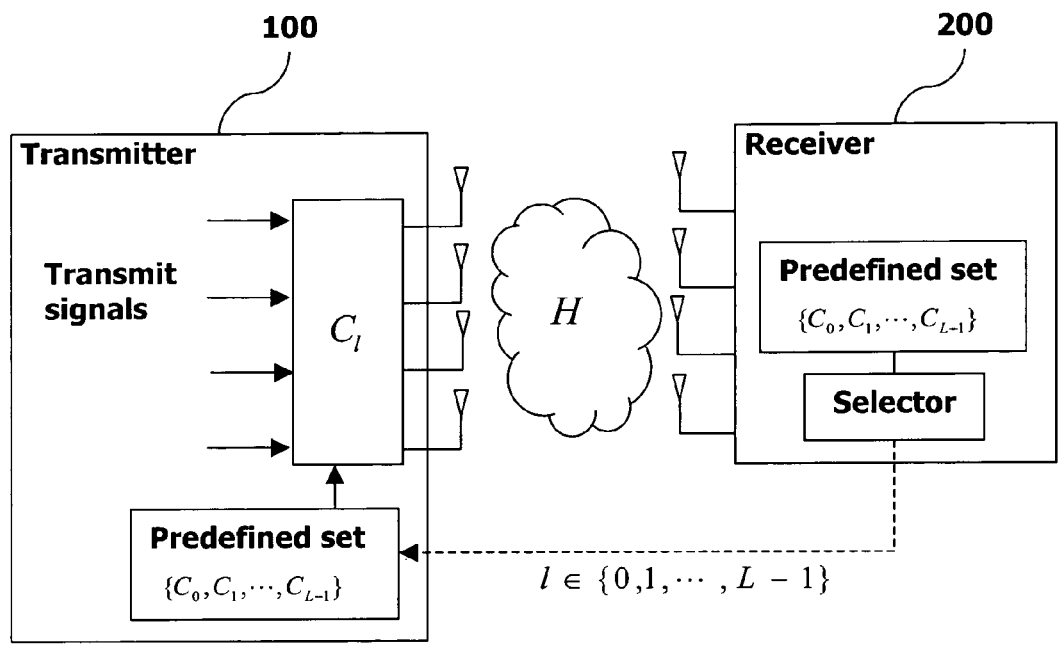
FIG. 1 illustrates the construction of a general closed-loop MIMO system.
Figure 2:
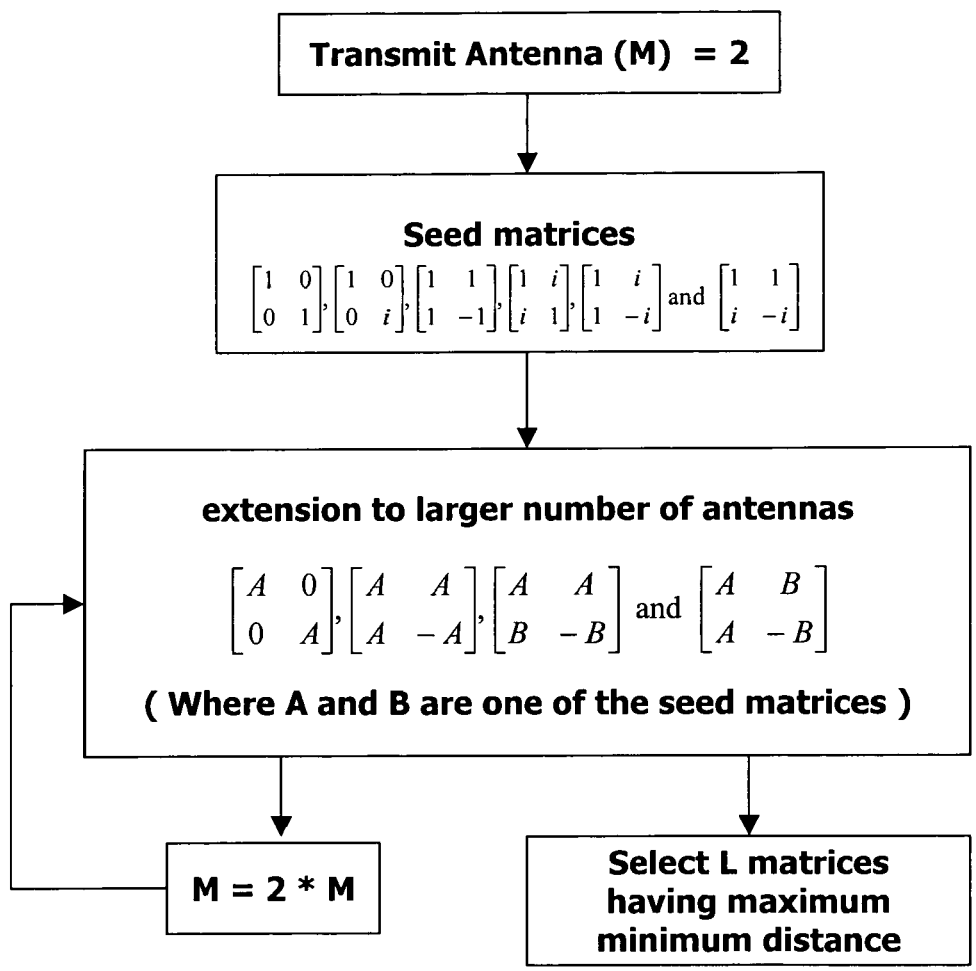
FIG. 2 illustrates a method for forming a predefined set in accordance with a preferred embodiment of the present invention.

FIG. 2 illustrates a method for forming a predefined set in accordance with a preferred embodiment of the present invention.

When there are two transmit antennas in a closed-loop MIMO system, seed matrices can be obtained by equation (2) shown below:

$$\begin{bmatrix} \exp\left(j\frac{2\pi k_{11}}{K}\right) & \exp\left(j\frac{2\pi k_{12}}{K}\right) \\ \exp\left(j\frac{2\pi k_{21}}{K}\right) & \exp\left(j\frac{2\pi k_{22}}{K}\right) \end{bmatrix} \quad (2)$$

wherein $k_{mn}$ has an arbitrary value of integer values of 0, 1, ..., K−1, 'm' is a row and 'n' is a column.

Below equation (3) shows seed matrices of the closed-loop MIMO system when there are two transmit antennas and K=4 (which means a unit circle is divided into 4 parts). The seed matrices have a long distance with each other, among matrices obtained by equation (2), namely, which are not similar to each other.

$$\begin{bmatrix} 1 & 0 \\ 0 & 1 \end{bmatrix}, \begin{bmatrix} 1 & 0 \\ 0 & i \end{bmatrix}, \begin{bmatrix} 1 & 1 \\ 1 & -1 \end{bmatrix}, \begin{bmatrix} 1 & i \\ i & 1 \end{bmatrix}, \begin{bmatrix} 1 & i \\ 1 & -i \end{bmatrix}, \text{ and } \begin{bmatrix} 1 & 1 \\ i & -i \end{bmatrix} \quad (3)$$

When the number of transmit antennas is increased to 4 in the closed-loop MIMO system, matrices can be increased as expressed in equation (4) shown below. 'A' and 'B' of equation (4) are matrices of a previous step (or dimension). That is, 'A' and 'B' are seed matrices when there are two transmit antennas. Equation (4) is based on Hadamard matrix, by which candidate matrices (elements of the predefined set) can be formed simply when the number of transmit antennas is doubled (increased). The Hadamard matrix is essential for processing a signal of wireless communication. The reason of using the Hadamard matrix is because a matrix element is simple as ±1 and as an orthogonal matrix it does not require a multiplier and thus signals can be processed at a high speed and implementation of hardware is easy.

$$\begin{bmatrix} A & 0 \\ 0 & A \end{bmatrix}, \begin{bmatrix} A & A \\ A & -A \end{bmatrix}, \begin{bmatrix} A & A \\ B & -B \end{bmatrix}, \text{ and } \begin{bmatrix} A & B \\ A & -B \end{bmatrix} \quad (4)$$

In the above matrices, a normalization constant of each matrix is omitted for the sake of convenience. When transmit antennas are increased to 8, matrices can be extended to the form of equation (4) and the matrices become candidate matrices forming a predefined set.

After the candidate matrices are determined, the receiver 200 selects an optimal solution of the candidate matrices and feeds back a corresponding index to the transmitter 100.

In the present invention, as a reference for obtaining the optimal solution, equation (5) shown below is proposed:

$$\arg\min_l \prod_m (C_l^H H^H H C_l)_{mm} \quad (5)$$

The equation (5) is based on orthogonalization of a radio channel (H), and in the present invention, an optimal solution is determined by substituting the predefined set to equation (5). A step of obtaining $C_{optimal}$ is not necessary in the present invention. 'H' in equation (5) is a matrix indicating the radio channel and $[\ ]^H$ means conjugate transpose.

As so far described, the closed-loop MIMO system of the present invention has the following advantages.

That is, for example, candidate matrices forming a predefined set can be easily obtained. In addition, although the number of transmit antennas increases, candidate matrices can be simply obtained by using candidate matrices of a previous set. Moreover, by proposing a reference for selecting an optimal solution with a small amount of calculation, burden on a system can be considerably reduced.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. An apparatus compatible with a closed-loop loop multiple-input multiple-output (MIMO) system, the apparatus comprising:
a plurality of antennas used to send and receive signals; and
a transmitter configured to utilize a first group of matrices for processing signals when a total number of the plurality of antennas is two and to utilize a second group of matrices for processing the signals when the total number of the plurality of antennas is four or more,
wherein the transmitter processes the first group of matrices and the second group of matrices, and wherein matrices of the second group are selected from at least one of the matrices of the first group, wherein a form of the first group of matrices comprises at least one of:

$$\begin{bmatrix} 1 & 0 \\ 0 & 1 \end{bmatrix}, \begin{bmatrix} 1 & 0 \\ 0 & i \end{bmatrix}, \begin{bmatrix} 1 & 1 \\ 1 & -1 \end{bmatrix}, \begin{bmatrix} 1 & i \\ i & 1 \end{bmatrix}, \begin{bmatrix} 1 & i \\ 1 & -i \end{bmatrix}, \text{ and } \begin{bmatrix} 1 & 1 \\ i & -i \end{bmatrix}$$

where i denotes a variable, wherein a form of the second group of matrices comprises at least one of:

$$\begin{bmatrix} A & 0 \\ 0 & A \end{bmatrix}, \begin{bmatrix} A & A \\ A & -A \end{bmatrix}, \begin{bmatrix} A & A \\ B & -B \end{bmatrix}, \text{ and } \begin{bmatrix} A & B \\ A & -B \end{bmatrix}$$

where A and B are matrices selected from the first group of matrices, wherein the transmitter is further configured to receive feedback information containing a corresponding index of one or more matrices of the second group selected from the matrices of the first group, and wherein selection of matrices from the first group is based upon an orthogonalization of a radio channel for the closed-loop MIMO system.

2. The apparatus of claim 1, wherein the total number of the plurality of antennas is four, eight, or more than eight.

3. A method of processing signals for a closed-loop multiple input multiple output (MIMO) system having a transmitter and a receiver, the method comprising:

obtaining one or more seed matrices of the closed-loop MIMO system that uses a particular number of transmit antennas, at least one of the one or more seed matrices having a two-by-two format;

obtaining one or more candidate matrices based on the one or more seed matrices in order to accommodate a greater number of transmit antennas than the particular number of transmit antennas;

selecting at least one matrix among the one or more candidate matrices; and providing, to a transmitter, feedback information containing a corresponding index of the selected at least one matrix, wherein selecting the at least one matrix is based upon an orthogonalization of a radio channel for the closed-loop MIMO system.

4. The method of claim 3, wherein selecting the at least one matrix is performed such that calculations during signal processing are minimized.

5. The method of claim 4, wherein obtaining the one or more seed matrices comprises defining and storing the one or more seed matrices.

6. The method of claim 4, wherein obtaining the one or more seed matrices comprises accessing previously stored one or more seed matrices.

7. The method of claim 4, wherein obtaining the one or more candidate matrices comprises defining and storing the one or more candidate matrices.

8. The method of claim 4, wherein obtaining the one or more candidate matrices comprises extending the one or more seed matrices.

* * * * *